US009254822B1

(12) United States Patent
Friend et al.

(10) Patent No.: US 9,254,822 B1
(45) Date of Patent: Feb. 9, 2016

(54) SYSTEM AND METHOD FOR ESTIMATING POSITION OF MACHINE

(71) Applicant: Caterpillar Inc., Peoria, IL (US)

(72) Inventors: Paul R. Friend, Morton, IL (US); Timothy Evans, Peoria, IL (US); Qi Chen, Dunlap, IL (US); Andrew T. Whitten, Dunlap, IL (US); Nicholas R. Vogel, Peoria, IL (US); Hong Chang, Peoria, IL (US); Salman Chikni, Peoria, IL (US); Frank A. Willis, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/519,822

(22) Filed: Oct. 21, 2014

(51) Int. Cl.
B60T 7/12 (2006.01)
G01C 21/16 (2006.01)

(52) U.S. Cl.
CPC .. B60T 7/12 (2013.01); G01C 21/16 (2013.01)

(58) Field of Classification Search
CPC .................................. B60T 7/12; G01C 21/16
USPC ...................... 701/70, 408, 472, 500; 318/587
See application file for complete search history.

(56) References Cited

U.S. PATENT DOCUMENTS

| 5,184,304 | A | 2/1993 | Huddle |
| 5,375,059 | A | 12/1994 | Kyrtsos et al. |
| 5,956,250 | A * | 9/1999 | Gudat ................ B60K 31/0008 318/587 |
| 7,805,245 | B2 | 9/2010 | Bacon et al. |
| 7,979,231 | B2 | 7/2011 | Eckert |
| 8,290,744 | B2 | 10/2012 | Brady et al. |
| 8,630,461 | B2 * | 1/2014 | Miyajima ............... G01C 21/28 382/104 |
| 2013/0218504 | A1 | 8/2013 | Fall et al. |

* cited by examiner

Primary Examiner — Tan Q Nguyen
(74) Attorney, Agent, or Firm — Finnegan, Henderson, Farabow, Garrett & Dunner, LLP

(57) ABSTRACT

A system having a primary inertial measurement unit and a secondary inertial measurement unit configured to generate a primary position signal and a secondary position signal respectively is provided. The system also includes an error detection module communicably coupled to the primary inertial measurement unit and the secondary inertial measurement unit. The error detection module is configured to receive the primary position signal and the secondary position signal and detect if an out-range error is present in at least one of the primary position signal and the secondary position signal. The error detection module is also configured to detect if an in-range error is present in at least one of the primary position signal and the secondary position signal and determine an action to be performed based on the presence of at least one of the out-range error and the in-range error.

20 Claims, 4 Drawing Sheets

SYSTEM AND METHOD FOR ESTIMATING POSITION OF MACHINE

TECHNICAL FIELD

The present disclosure relates to a position detection system for a machine, and more specifically to systems and methods for estimating a position of a machine, using an inertial measurement unit.

BACKGROUND

A position detection system employed on a machine may make use of two inertial measurement units to generate signals indicative of a current position of the machine. In high integrity positioning systems, it may be needed to cross check readings obtained from the two inertial measurement units with each other. This cross checking may be utilized to verify if both or any one of the two inertial measurement units are working satisfactorily. However, in a scenario in which one of the two inertial measurement units has failed, it may be difficult to determine which one of the two inertial measurement units is faulty.

Sometimes, a third inertial measurement unit may be employed to determine the faulty inertial measurement unit. However, by using an additional third inertial measurement unit the overall cost and complexity of the system is increased.

U.S. Pat. No. 8,290,744, hereinafter referred to as the '744 Patent, describes a system for providing fault tolerant inertial measurement data. The system includes a sensor having less accuracy than an inertial measurement unit for measuring an inertial parameter. The system also includes a processor for detecting whether a difference exists between a first data stream received from a first inertial measurement unit and a second data stream received from a second inertial measurement unit. The processor upon detecting the difference determines whether at least one of the first or second inertial measurement units has failed by comparing each of the first and second data streams to the inertial parameter.

However, the '744 Patent includes an additional sensor in addition to the first inertial measurement unit and the second inertial measurement unit. The additional sensor may add to an overall cost and complexity of the system.

SUMMARY OF THE DISCLOSURE

In one aspect of the present disclosure, a system is provided. The system includes a primary inertial measurement unit configured to generate a primary position signal. The primary position signal is indicative of an estimated position of a machine on a worksite. The system also includes a secondary inertial measurement unit configured to generate a secondary position signal. The secondary position signal is indicative of the estimated position of the machine. The system further includes an error detection module communicably coupled to the primary inertial measurement unit and the secondary inertial measurement unit. The error detection module is configured to receive the primary position signal from the primary inertial measurement unit. The error detection module is configured to receive the secondary position signal from the secondary inertial measurement unit. The error detection module is configured to detect if an out-range error is present in at least one of the primary position signal and the secondary position signal. The presence of the out-range error is based on the respective primary position signal or the secondary position signal exceeding a first predetermined threshold. The error detection module is also configured to detect if an in-range error is present in at least one of the primary position signal and the secondary position signal based, at least in part, on the presence of the out-range error in the respective primary position signal or the secondary position signal. The presence of the in-range error is based on the respective primary position signal or the secondary position signal exceeding a second predetermined threshold. The error detection module is further configured to determine an action to be performed based, at least in part, on the presence of at least one of the out-range error and the in-range error in the respective primary position signal or the secondary position signal.

In another aspect of the present disclosure, a method is provided. The method includes receiving a primary position signal from a primary inertial measurement unit. The primary position signal is indicative of an estimated position of a machine on a worksite. The method includes receiving a secondary position signal from a secondary inertial measurement unit. The secondary position signal is indicative of the estimated position of the machine. The method includes detecting if an out-range error is present in at least one of the primary position signal and the secondary position signal. The presence of the out-range error is based on the respective primary position signal or the secondary position signal exceeding a first predetermined threshold. The method also includes detecting if an in-range error is present in at least one of the primary position signal and the secondary position signal based, at least in part, on the presence of the out-range error in the respective primary position signal or the secondary position signal. The presence of the in-range error is based on the respective primary position signal or the secondary position signal exceeding a second predetermined threshold. The method further includes determining an action to be performed based, at least in part, on the presence of at least one of the out-range error and the in-range error in the respective primary position signal or the secondary position signal.

In yet another aspect of the present disclosure, a machine is provided. The machine includes an engine and a transmission module operatively coupled to the engine. The machine includes a position detection system. The position detection system is configured to generate a signal indicative of a current position of the machine on a worksite. The machine includes a primary inertial measurement unit configured to generate a primary position signal. The primary position signal is indicative of an estimated position of the machine on the worksite. The machine also includes a secondary inertial measurement unit configured to generate a secondary position signal. The secondary position signal is indicative of the estimated position of the machine. The machine further includes an error detection module communicably coupled to the primary inertial measurement unit and the secondary inertial measurement unit. The error detection module is configured to receive the primary position signal from the primary inertial measurement unit. The error detection module is configured to receive the secondary position signal from the secondary inertial measurement unit. The error detection module is configured to detect if an out-range error is present in at least one of the primary position signal and the secondary position signal. The presence of the out-range error is based on the respective primary position signal or the secondary position signal exceeding a first predetermined threshold. The error detection module is also configured to detect if an in-range error is present in at least one of the primary position signal and the secondary position signal based, at least in part, on the presence of the out-range error in the respective primary position signal or the secondary position signal. The presence of the in-range error is based on the respective primary position signal or the secondary position signal exceeding a second predetermined threshold. The error detection module is further configured to determine an action to be performed based, at least in part, on the presence of at least one of the out-range error and the in-range error in the respective primary position signal or the secondary position signal.

Other features and aspects of this disclosure will be apparent from the following description and the accompanying drawings.

DETAILED DESCRIPTION

Figure 1:
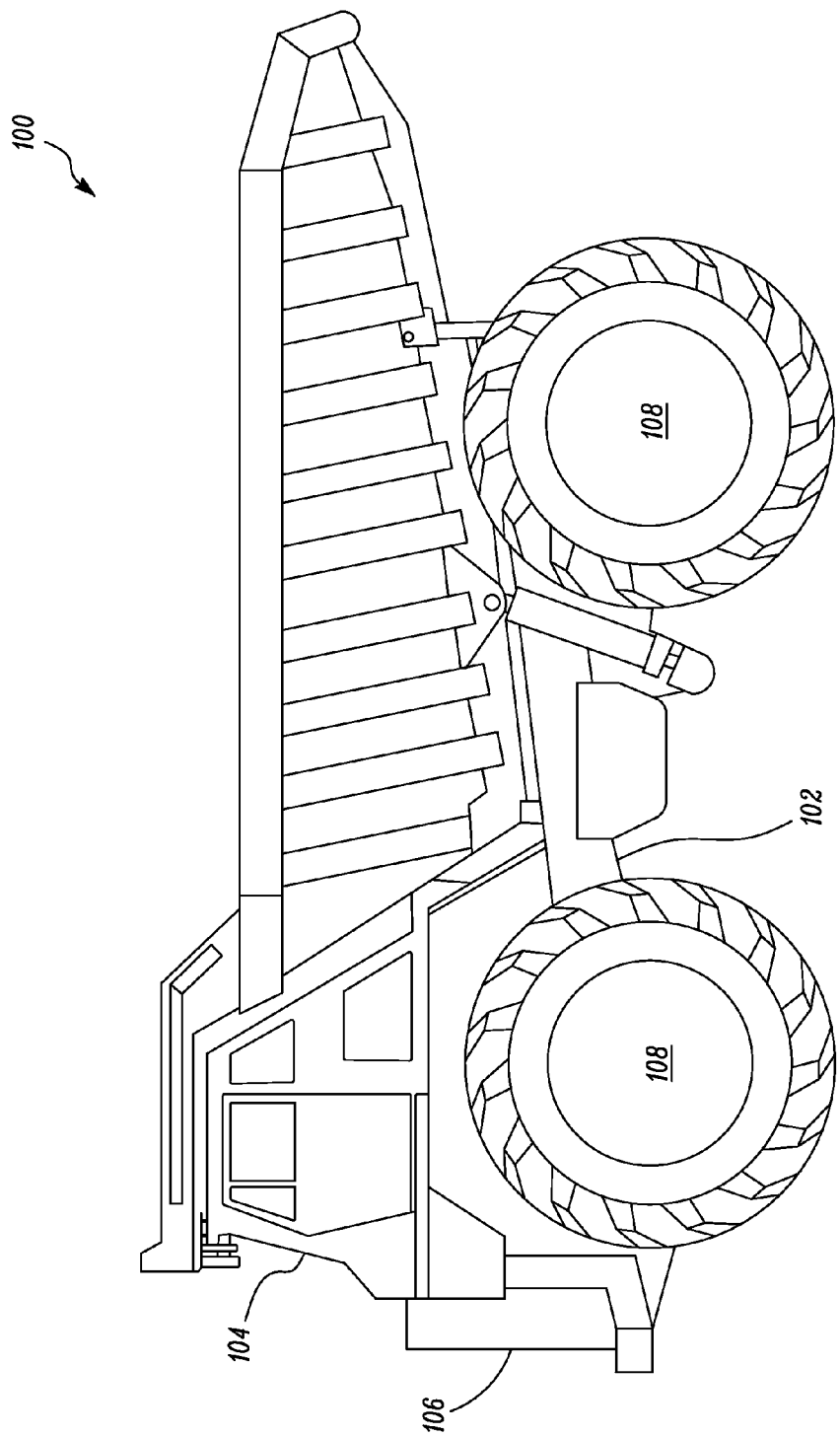
FIG. 1 is a side view of an exemplary machine, according to an embodiment of the present disclosure.

Wherever possible, the same reference numbers will be used throughout the drawings to refer to the same or similar parts. FIG. 1 illustrates an exemplary machine 100, according to one embodiment of the present disclosure. More specifically, the machine 100 is a haul truck. It should be noted that the machine 100 may include any other industrial machine including, but not limited to, a large mining truck, an articulated truck, and an off-highway truck, associated with an industry such as, transportation, construction, mining, agriculture, waste management, forestry, and so on. The machine 100 is configured for transportation of materials and/or goods from one location to another on a worksite on which the machine 100 may be deployed. Further, the machine 100 is an autonomous machine such that the machine 100 may be operated from a remote location away from the machine 100 such as, a worksite control station by any method known in the art.

The machine 100 includes a frame 102. An operator cabin 104 may be provided on the frame 102. The operator cabin 104 may house various controls of the machine 100. An enclosure 106 is also provided on the frame 102. The enclosure 106 may house an engine (shown in FIG. 2). The engine may be an internal combustion engine, a gas turbine engine, a hybrid engine, a non-conventional power source for example, batteries, or any other power source known in the art. A set of ground engaging members 108, such as wheels, may be provided on the machine 100 for the purpose of mobility.

The machine 100 may also include a transmission module 202 (shown in FIG. 2) operatively coupled to the engine. The transmission module 202 may include a torque convertor, one or more clutches, gearing, drive shafts, propeller shaft, differentials and other known drive links for transmission of motive power from the engine to the ground engaging members 108. Additionally, the transmission module 202 may also include one or more sensors such as, a speed sensor, a steering angle sensor, a tilt angle sensor, sensors associated with the engine such as, an engine speed sensor, a cylinder pressure sensor, a fuel rate sensor, and so on.

Figure 2:
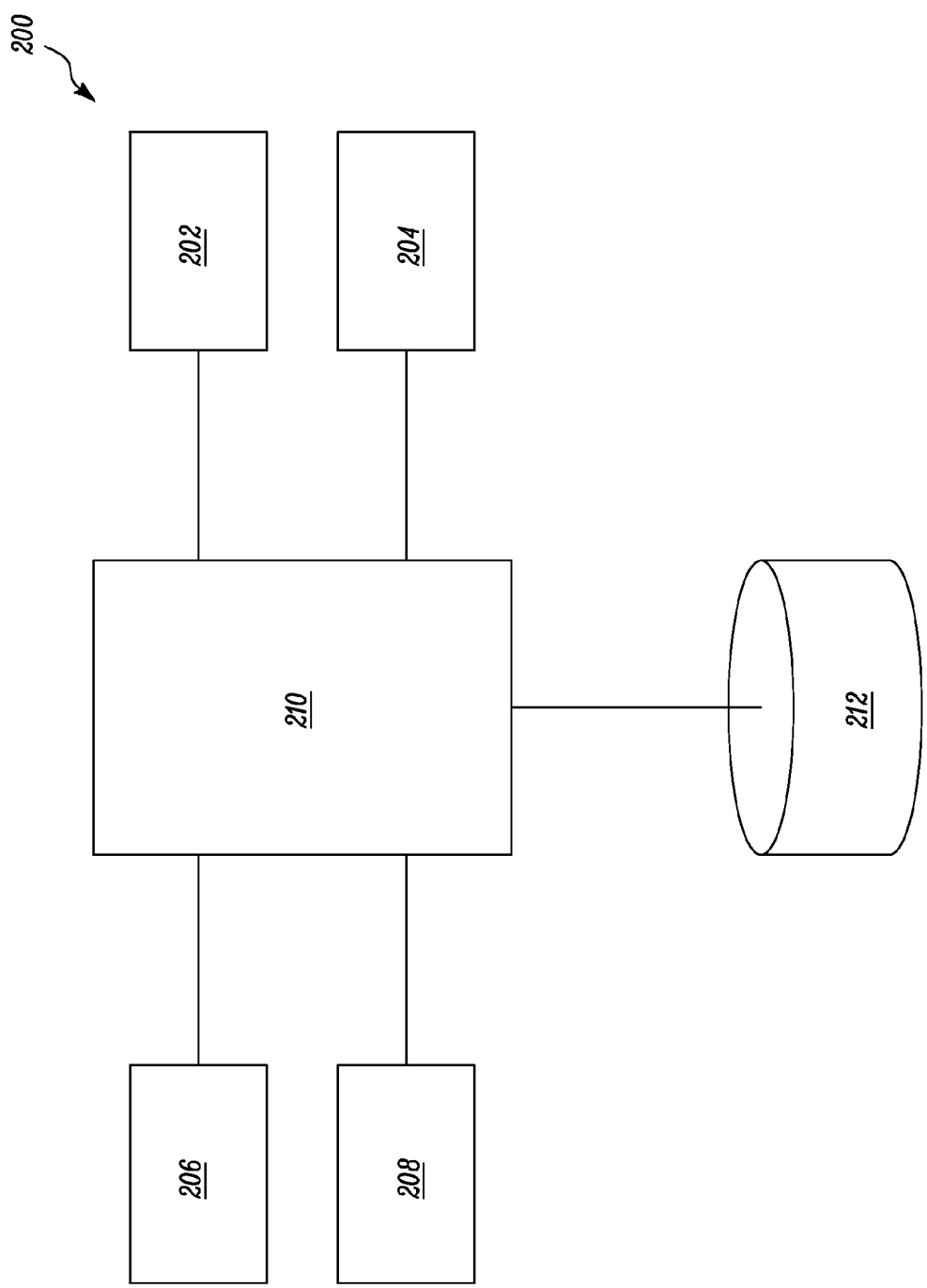
FIG. 2 is a block diagram of an exemplary system for estimating a position of the machine, according to an embodiment of the present disclosure.

Additionally, the machine 100 also includes a position detection system 204 (shown in FIG. 2). The position detection system 204 is configured to generate a signal indicative of a current position of the machine 100 on the worksite. The position detection system 204 may be any position determination system known in the art. The machine 100 further includes a system 200 (shown in FIG. 2) for estimating a position of the machine 100 on the worksite. The system 200 will now be described with reference to FIGS. 2 and 3.

Referring to FIG. 2, a block diagram of the system 200 is illustrated. The system 200 includes a primary inertial measurement unit, hereinafter referred to as primary IMU 206. The primary IMU 206 is configured to generate a primary position signal. The primary position signal is indicative of an estimated position of the machine 100 on the worksite. The system 200 also includes a secondary inertial measurement unit, hereinafter referred to as a secondary IMU 208. The secondary IMU 208 is configured to generate a secondary position signal. The secondary position signal is also indicative of the estimated position of the machine 100 on the worksite.

The change in the position of the machine 100 may be computed or derived from angular rates and acceleration of the machine 100. For example, the primary IMU 206 and/or the secondary IMU 208 may include a 6-degree of freedom (6 DOF) IMU. A 6 DOF IMU includes a 3-axis accelerometer, a 3-axis angular rate gyroscope, and may optionally include a 2-axis inclinometer. The 3-axis angular rate gyroscope may provide signals indicative of a gyroscopic value. The gyroscopic value may include a pitch rate, a yaw rate, and a roll rate of the machine 100. The 3-axis accelerometer may provide signals indicative of an accelerometer value. The accelerometer value may include the acceleration of the machine 100 in X, Y, and Z directions. The primary IMU 206 may be any high grade IMU known in the art. Further, the secondary IMU 208 may be any medium grade or low grade IMU known in the art.

The system 200 also includes an error detection module 210. The error detection module 210 is communicably coupled to the primary IMU 206. Accordingly, the error detection module 210 is configured to receive the primary position signal from the primary IMU 206. Also, the error detection module 210 is communicably coupled to the secondary IMU 208. Accordingly, the error detection module 210 is configured to receive the secondary position signal from the secondary IMU 208. It should be noted that the primary IMU 206 and the secondary IMU 208 may be pre-designated in the system 200. As such the error detection module 210 may give priority and preference to the primary IMU 206. Additionally, the error detection module 210 is communicably coupled to the position detection system 204, the transmission module 202 and a database 212, and will be explained in detail in subsequent sections.

The error detection module 210 is configured to detect if an out-range error is present in the primary position signal, or the secondary position signal, or both. The presence of the out-range error is detected in the primary position signal when co-ordinates or readings of the primary position signal exceed a first predetermined threshold. Similarly, the presence of the out-range error is detected in the secondary position signal when co-ordinates or readings of the secondary position signal exceed the first predetermined threshold.

The first predetermined threshold may be a threshold gyroscopic value or a threshold acceleration value. The first predetermined threshold may be stored in the database 212. Accordingly, the error detection module 210 may retrieve the first predetermined threshold from the database 212 to perform the detection. In other embodiments, the first predetermined threshold may be stored in an internal memory (not shown) of the error detection module 210. A person of ordinary skill in the art will appreciate that the detection for the primary position signal and the secondary position signal may take place simultaneously or consecutively as per system design. Also, the determination may be performed on a periodic basis or may be initiated manually or based on a state of the machine 100.

In case of the primary IMU 206, when a gyroscopic value or an accelerometer value exceeds the threshold gyroscopic value or the threshold acceleration value respectively, the presence of the out-range error is detected in the primary IMU 206 and the associated primary position signal. Similarly, in case of the secondary IMU 208, when a gyroscopic value or an accelerometer value exceeds the threshold gyroscopic value or the threshold acceleration value respectively, the presence of the out-range error is detected in the secondary IMU 208 and the associated secondary position signal. Also, in case of the primary IMU 206 or the secondary IMU 208, when the gyroscopic value or the accelerometer value is equal to or lower than the threshold gyroscopic value or the threshold acceleration value respectively, no out-range error is detected in the primary IMU 206 or the secondary IMU 208 respectively.

For example, when the threshold gyroscopic value is 100 degrees per second (deg/sec). In such a situation, if the gyroscopic value of the primary IMU 206, or the secondary IMU 208, or both exceed 100 deg/sec, the out-range error may be detected in the primary IMU 206 or the secondary IMU 208 or both. In another embodiment, when the threshold acceleration value is 20 meters per second square ($m/s^2$). In such a situation, if the acceleration value of the primary IMU 206, or the secondary IMU 208, or both exceed 20 $m/s^2$, the out-range error is detected in the primary IMU 206, or the secondary IMU 208, or both. A person of ordinary skill in the art will appreciate that the values mentioned herein are exemplary and do not limit the scope of the disclosure.

It should be noted that the threshold gyroscopic value associated with the primary IMU 206 may be same or different from the threshold gyroscopic value associated with the secondary IMU 208 based on system design and configuration. Additionally, the threshold acceleration value associated with the primary IMU 206 may be same or different from the threshold acceleration value associated with the secondary IMU 208 based on system design and configuration.

The error detection module 210 is also configured to detect if an in-range error is present in the primary position signal, or the secondary position signal, or both. The detection of the presence of the in-range error may be performed based on the presence of the out-range error. For example, when the error detection module 210 detects an absence of the out-range error in the primary IMU 206 and the associated primary position signal, the error detection module 210 further performs a check to detect the presence of the in-range error in the primary IMU 206.

Similarly, when the error detection module 210 detects an absence of the out-range error in the secondary IMU 208 and the associated secondary position signal, the error detection module 210 further performs a check to detect the presence of the in-range error in the secondary IMU 208. A person of ordinary skill in the art will appreciate that the detection for the primary position signal and the secondary position signal may take place simultaneously or consecutively as per system design. Also, the determination may be performed on a periodic basis or may be initiated manually or based on a state of the machine 100.

The presence of the in-range error in the primary position signal is based on exceeding a second predetermined threshold. Additionally, the presence of the in-range error in the secondary position signal is also based on exceeding the second predetermined threshold. The second predetermined threshold may be stored in the database 212. Accordingly, the error detection module 210 may retrieve the second predetermined threshold from the database 212. In other embodiments, the second predetermined threshold may be stored in the internal memory (not shown) of the error detection module 210. In one embodiment, the gyroscopic value of the primary IMU 206 may be compared with the gyroscopic value of the secondary IMU 208. In other embodiment, the acceleration value of the primary IMU 206 may be compared to the acceleration value of the secondary IMU 208.

The second predetermined threshold is based on a correlation between the primary position signal and the secondary position signal. In one embodiment, the correlation may be an absolute value of the gyroscopic value of the primary IMU 206 or the secondary IMU 208. For example, when the gyroscopic value of the primary IMU 206 is 100 deg/sec and the secondary predetermined threshold is ±10 deg/sec of 100 deg/sec. In such a situation, when the gyroscopic value of the secondary IMU 208 is greater than 110 deg/sec, or lower than 90 deg/sec, the in-range error is detected in the secondary IMU 208.

Similarly, in some embodiments, the correlation may be an absolute value of the acceleration value of the primary IMU 206 or the secondary IMU 208. For example, when the acceleration value of the primary IMU 206 is 20 $m/s^2$ and the absolute value is 2 $m/s^2$. In such a situation, when the acceleration value of the secondary IMU 208 is greater than 22 $m/s^2$ or lower than 18 $m/s^2$, the in-range error is detected in the secondary IMU 208.

In another embodiment, the correlation may be a percentage of the gyroscopic value of the primary IMU 206 or the secondary IMU 208. For example, when the gyroscopic value of the primary IMU 206 is 100 deg/sec and the percentage is ±10%. In such a situation, when the gyroscopic value of the secondary IMU 208 is greater than 110 deg/sec, or lower than 90 deg/sec, the in-range error is detected in the secondary IMU 208.

Similarly, in some embodiments, the correlation may be a percentage of the acceleration value of the primary IMU 206 or the secondary IMU 208. For example, when the acceleration value of the primary IMU 206 is 20 $m/s^2$ and the percentage is 10%. In such a situation, when the acceleration value of the secondary IMU 208 is greater than 22 $m/s^2$ or lower than 18 $m/s^2$, the in-range error is detected in the secondary IMU 208.

Figure 3:
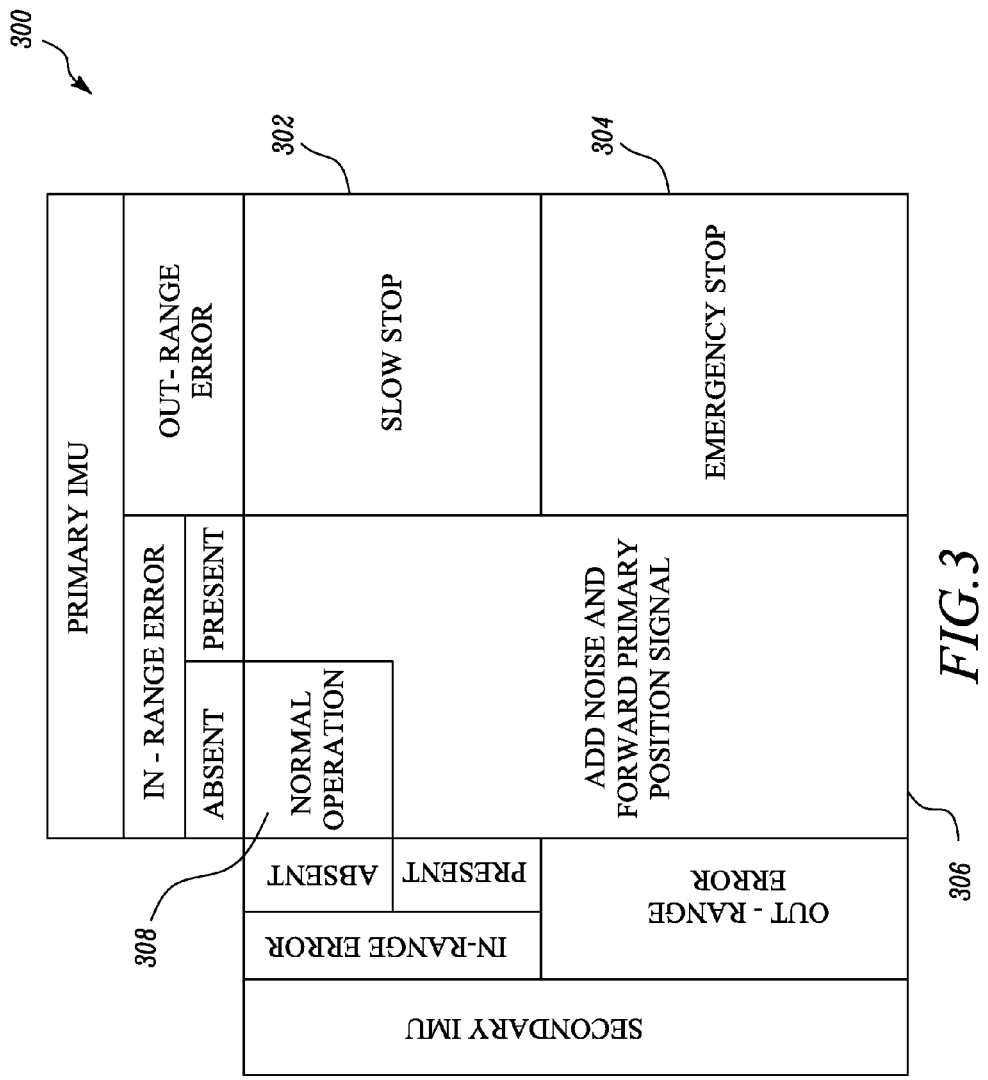
FIG. 3 is a table of the working of the system for estimating the position of the machine, according to an embodiment of the present disclosure.

The error detection module 210 is further configured to determine an action to be performed based on detecting the presence of any one of the out-range error or the in-range error, or both in the respective primary position signal or the secondary position signal respectively. Referring to FIG. 3, a table 300 of the working of the system 200 for estimating the position of the machine 100 is illustrated. More specifically, the table describes different actions performed by the error detection module 210 based on the detecting the presence of the out-range error, the in-range error or both in the primary position signal, or the secondary position signal, or both.

In one embodiment, as shown in section 302, if the presence of the out-range error is detected in the primary position signal, the error detection module 210 also check if the out-range error is present in the secondary position signal. If the error detection module 210 detects the absence of the out-range error in the secondary position signal, the error detection module 210 is configured to stop the machine 100 within a first predetermined distance, a first predetermined time duration, or both. The first predetermined distance or the first predetermined time duration may be selected so as to stop the machine 100 gradually based on one or more machine parameters including, but not limited to, engine speed, and linear speed of the machine 100 at the worksite.

In another embodiment, as shown in section 304, if the presence of the out-range error is detected in the primary position signal, the error detection module 210 also checks if the out-range error is present in the secondary position signal as described in relation to section 302. If the error detection module 210 detects the presence of the out-range error in the secondary position signal, the error detection module 210 is configured to stop the machine 100 within a second predetermined distance, a second predetermined time duration, or both. The first predetermined distance, the second predetermined distance, the first predetermined time duration and the second predetermined time duration may be stored in the database 212 or the internal memory of the error detection module 210.

It should be noted that the first predetermined distance is greater than the second predetermined distance. Also, the first predetermined time duration is greater than the second predetermined time duration. The second predetermined distance or the second predetermined time duration may be selected so as to stop the machine 100 as soon as possible, as such in case of an emergency stop. Whereas, the first predetermined distance or the first predetermined time duration may be selected so as to stop the machine 100 comparatively slowly. Further, the secondary position signal may be used by the error detection module 210 in order to bring the machine 100 to the slow stop as shown in section 302 of the table.

The emergency stopping of the machine 100 (see section 304 in table 300) may be performed based on odometry and other machine parameters, making use of methods known in the art. The machine parameters may include, but not limited to, engine speed, linear speed of the machine 100 at the worksite, and a steering angle. Odometry may relate to computation of a linear distance traversed by the machine 100 based on a size of the wheel and a rotational speed of the wheel of the machine 100. Accordingly, based on the action to be performed in section 302 or section 304, the error detection module 210 may send an appropriate command signal to the transmission module 202 of the machine 100 to stop the machine 100, when the presence of the out-range error in the primary position signal associated with the primary IMU 206 is detected.

In yet another embodiment, as shown in section 306, if the out-range error is not detected or is absent in the primary position signal, the error detection module 210 also checks for the presence of the out-range error in the secondary position signal. If the error detection module 210 detects the presence of the out-range error in the secondary position signal, the error detection module 210 is configured to ignore the secondary position signal. Additionally, the error detection module 210 is configured to add a predetermined noise to the primary position signal. The predetermined noise may be stored in the database 212 or the internal memory of the error detection module 210. In one embodiment, the predetermined noise may be an absolute value. In other embodiments, the predetermined noise may be a fixed percentage of the primary position signal. Further, the error detection module 210 is configured to forward the primary position signal with the added predetermined noise to the position detection system 204.

In other embodiments, as shown in section 306, if the out-range error is not detected or is absent in both the primary position signal and the secondary position signal, the error detection module 210 checks for the presence of the in-range error in the primary position signal and the secondary position signal separately. If the error detection module 210 detects the presence of the in-range error in any one of the primary position signal or the secondary position signal, the error detection module 210 is configured to ignore the secondary position signal and add the predetermined noise to the primary position signal. Further, the error detection module 210 is configured to forward the primary position signal with the added predetermined noise to the position detection system 204.

In some embodiments, as shown in section 308, if the out-range error is not detected or is absent in both of the primary position signal and the secondary position signal, the error detection module 210 checks for the presence of the in-range error in the primary position signal and the secondary position signal separately. If the presence of the in-range error is not detected or is absent in both of the primary position signal and the secondary position signal, the error detection module 210 is configured to forward the primary position signal to the position detection system 204.

The error detection module 210 may embody a single microprocessor or multiple microprocessors that includes a means for receiving signals from the primary IMU 206 and/or the secondary IMU 208. Numerous commercially available microprocessors may be configured to perform the functions of the error detection module 210. It should be appreciated that the error detection module 210 may readily embody a general machine microprocessor capable of controlling numerous machine functions. A person of ordinary skill in the art will appreciate that the error detection module 210 may additionally include other components and may also perform other functionality not described herein. It should be understood that the embodiments and the configurations and connections explained herein are merely on an exemplary basis and may not limit the scope and spirit of the disclosure. Further, the error detection module 210 may be located on the machine 100 or away from the machine 100 such as in the worksite control station.

INDUSTRIAL APPLICABILITY

The system 200 provided herein employs two IMUs, viz., the primary IMU 206 and the secondary IMU 208 without making use of any additional IMU for cross checking and determining a faulty IMU. Also, the system 200 employs the high grade IMU as the primary IMU 206 and any of the mid grade IMU or the low grade IMU as the secondary IMU 208. This may in turn reduce an overall system cost and complexity.

Further, the method 400 provides determination of the faulty IMU out of the primary IMU 206 and the secondary IMU 208 while checking for the out-range error in the primary IMU 206, the secondary IMU 208, or both. Additionally, as described above, the method 400 provides forwarding of the primary position signal, as it is or with additional noise, to the position detection system 204 based on the presence of the in-range error in the primary IMU 206, the secondary IMU 208, or both. This may allow relatively accurately estimated position signals to be forwarded to the position detection system 204.

Figure 4:
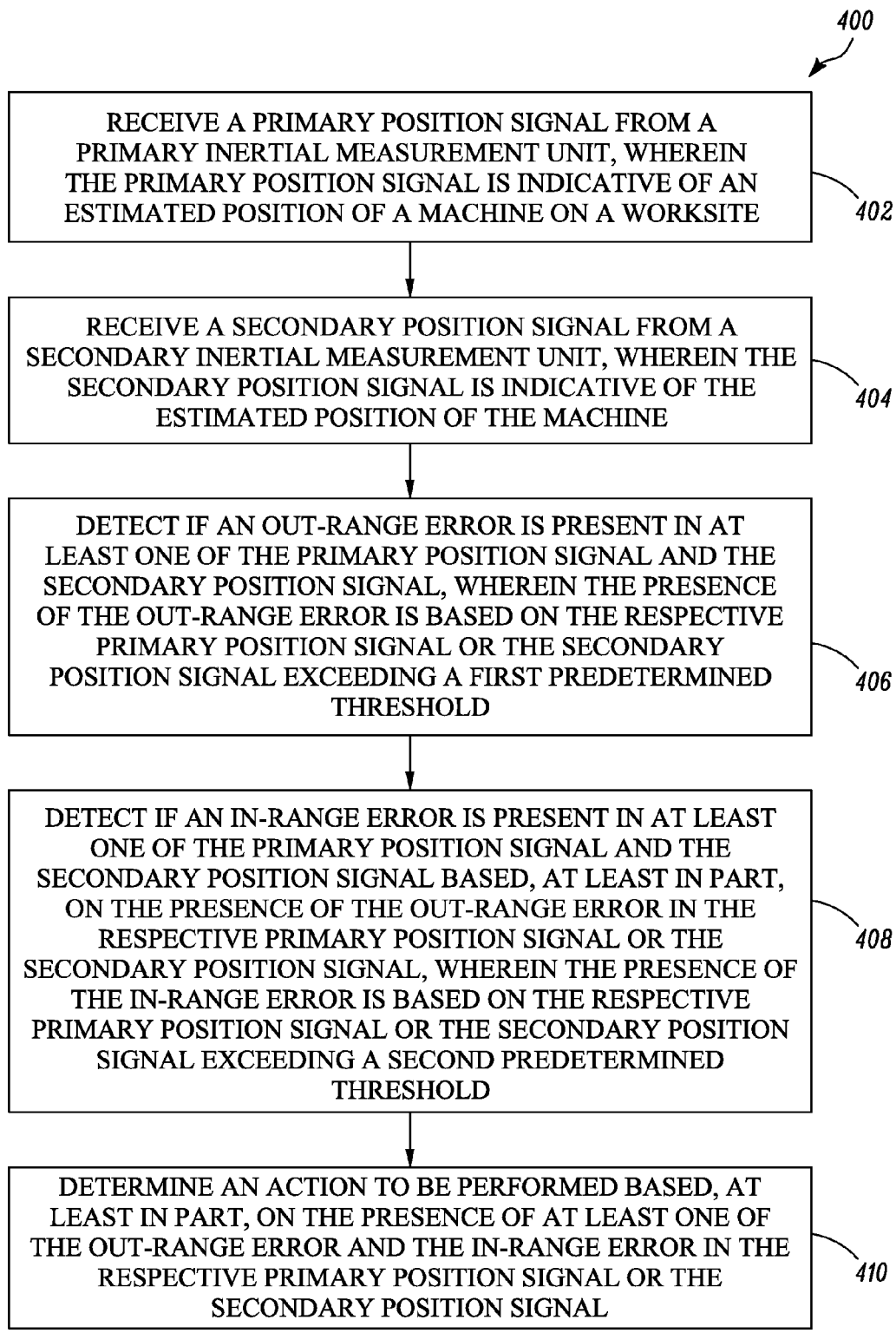
FIG. 4 is a flowchart of an exemplary method of the working of the system for estimating the position of the machine, according to an embodiment of the present disclosure.

Referring to FIG. 4, a flowchart of a method 400 is illustrated. At step 402, the error detection module 210 receives the primary position signal from the primary IMU 206. The primary position signal is indicative of the estimated position of the machine 100 on the worksite. At step 404, the error detection module 210 receives the secondary position signal from the secondary IMU 208. The secondary position signal is indicative of the estimated position of the machine 100.

At step 406, the error detection module 210 detects if the out-range error is present in at least one of the primary position signal and the secondary position signal. The presence of the out-range error is based on the respective primary position signal or the secondary position signal exceeding the first predetermined threshold. The first predetermined threshold is at least one of the threshold gyroscopic value and the threshold acceleration value.

At step 408, the error detection module 210 detects if the in-range error is present in at least one of the primary position signal and the secondary position signal based, at least in part, on the presence of the out-range error in the respective primary position signal or the secondary position signal. The presence of the in-range error is based on the respective primary position signal or the secondary position signal exceeding the second predetermined threshold. The second predetermined threshold is based on the correlation or comparison between the primary position signal and the secondary position signal.

At step 410, the error detection module 210 determines the action to be performed based, at least in part, on the presence of at least one of the out-range error and the in-range error in the respective primary position signal or the secondary position signal as described in relation to FIG. 3. In one embodiment, when the presence of the out-range error is detected in the primary position signal and the presence of the out-range error is not detected in the secondary position signal, the machine 100 is stopped within at least one of the first predetermined distance and the first predetermined time duration.

In another embodiment, when the presence of the out-range error is detected in both the primary position signal and the secondary position signal, the machine 100 is stopped within at least one of the second predetermined distance and the second predetermined time duration. The first predetermined distance is greater than the second predetermined distance. Also, the first predetermined time duration is greater than the second predetermined time duration.

In another embodiment, when the presence of the out-range error is not detected in the primary position signal and when the presence of any of the out-range error and the in-range error is detected in the secondary position signal, the predetermined noise is added to the primary position signal. Further, the primary position signal with the added predetermined noise is forwarded to the position detection system 204. In yet another embodiment, when the presence of none of the in-range error and the out-range error is detected in the primary position signal and the secondary position signal, the primary position signal is forwarded to the position detection system 204.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:
   a primary inertial measurement unit configured to generate a primary position signal, the primary position signal indicative of an estimated position of a machine on a worksite;
   a secondary inertial measurement unit configured to generate a secondary position signal, the secondary position signal indicative of the estimated position of the machine; and
   an error detection module communicably coupled to the primary inertial measurement unit and the secondary inertial measurement unit, the error detection module configured to:
      receive the primary position signal from the primary inertial measurement unit;
      receive the secondary position signal from the secondary inertial measurement unit;
      detect if an out-range error is present in at least one of the primary position signal and the secondary position signal, wherein the presence of the out-range error is based on the respective primary position signal or the secondary position signal exceeding a first predetermined threshold;
      detect if an in-range error is present in at least one of the primary position signal and the secondary position signal based, at least in part, on the presence of the out-range error in the respective primary position signal or the secondary position signal, wherein the presence of the in-range error is based on the respective primary position signal or the secondary position signal exceeding a second predetermined threshold; and
      determine an action to be performed based, at least in part, on the presence of at least one of the out-range error and the in-range error in the respective primary position signal or the secondary position signal.

2. The system of claim 1, wherein the first predetermined threshold is at least one of:
   a threshold gyroscopic value; and
   a threshold acceleration value.

3. The system of claim 1, wherein the second predetermined threshold is based on a correlation between the primary position signal and the secondary position signal.

4. The system of claim 1, wherein the error detection module is communicably coupled to a transmission module associated with the machine.

5. The system of claim 4, wherein if the presence of the out-range error is detected in the primary position signal, the action includes any one of:
   stopping the machine within at least one of a first predetermined distance and a first predetermined time duration; and
   stopping the machine within at least one of a second predetermined distance and a second predetermined time duration, such that the first predetermined distance is greater than the second predetermined distance and the first predetermined time duration is greater than the second predetermined time duration.

6. The system of claim 5, wherein the machine is stopped within at least one of the first predetermined distance and the first predetermined time duration if the presence of the out-range error is not detected in the secondary position signal.

7. The system of claim 5, wherein the machine is stopped within at least one of the second predetermined distance and the second predetermined time duration if the presence of the out-range error is detected in the secondary position signal.

8. The system of claim 1, wherein the error detection module is communicably coupled to a position detection system associated with the machine, the position detection system configured to generate a signal indicative of a current position of the machine on the worksite.

9. The system of claim 8, wherein if the presence of the out-range error is not detected in the primary position signal and if the presence of any of the out-range error and the in-range error is detected in the secondary position signal, the action includes:
    adding a predetermined noise to the primary position signal; and
    forwarding the primary position signal with the added predetermined noise to the position detection system.

10. The system of claim 8, wherein if the presence of the in-range error is not detected in the primary position signal and the secondary position signal, the action includes:
    forwarding the primary position signal to the position detection system.

11. A method comprising:
    receiving a primary position signal from a primary inertial measurement unit, wherein the primary position signal is indicative of an estimated position of a machine on a worksite;
    receiving a secondary position signal from a secondary inertial measurement unit, wherein the secondary position signal is indicative of the estimated position of the machine;
    detecting if an out-range error is present in at least one of the primary position signal and the secondary position signal, wherein the presence of the out-range error is based on the respective primary position signal or the secondary position signal exceeding a first predetermined threshold;
    detecting if an in-range error is present in at least one of the primary position signal and the secondary position signal based, at least in part, on the presence of the out-range error in the respective primary position signal or the secondary position signal, wherein the presence of the in-range error is based on the respective primary position signal or the secondary position signal exceeding a second predetermined threshold; and
    determining an action to be performed based, at least in part, on the presence of at least one of the out-range error and the in-range error in the respective primary position signal or the secondary position signal.

12. The method of claim 11, wherein the first predetermined threshold is at least one of:
    a threshold gyroscopic value; and
    a threshold acceleration value.

13. The method of claim 11, wherein the second predetermined threshold is based on a correlation between the primary position signal and the secondary position signal.

14. The method of claim 11, wherein if the presence of the out-range error is detected in the primary position signal, the action includes any one of:
    stopping the machine within at least one of a first predetermined distance and a first predetermined time duration; and
    stopping the machine within at least one of a second predetermined distance and a second predetermined time duration, such that the first predetermined distance is greater than the second predetermined distance and the first predetermined time duration is greater than the second predetermined time duration.

15. The method of claim 14, wherein the machine is stopped within at least one of the first predetermined distance and the first predetermined time duration if the presence of the out-range error is not detected in the secondary position signal.

16. The method of claim 14, wherein the machine is stopped within at least one of the second predetermined distance and the second predetermined time duration if the presence of the out-range error is detected in the secondary position signal.

17. The method of claim 11, wherein if the presence of the out-range error is not detected in the primary position signal and if the presence of any of the out-range error and the in-range error is detected in the secondary position signal, the action includes:
    adding a predetermined noise to the primary position signal; and
    forwarding the primary position signal with the added predetermined noise to a position detection system.

18. The method of claim 11, wherein if the presence of the in-range error is not detected in the primary position signal and the secondary position signal, the action includes:
    forwarding the primary position signal to a position detection system.

19. A machine comprising:
    an engine;
    a transmission module operatively coupled to the engine;
    a position detection system, the position detection system configured to generate a signal indicative of a current position of the machine on a worksite;
    a primary inertial measurement unit configured to generate a primary position signal, the primary position signal indicative of an estimated position of the machine on the worksite;
    a secondary inertial measurement unit configured to generate a secondary position signal, the secondary position signal indicative of the estimated position of the machine; and
    an error detection module communicably coupled to the primary inertial measurement unit and the secondary inertial measurement unit, the error detection module configured to:
        receive the primary position signal from the primary inertial measurement unit;
        receive the secondary position signal from the secondary inertial measurement unit;
        detect if an out-range error is present in at least one of the primary position signal and the secondary position signal, wherein the presence of the out-range error is based on the respective primary position signal or the secondary position signal exceeding a first predetermined threshold;
        detect if an in-range error is present in at least one of the primary position signal and the secondary position signal based, at least in part, on the presence of the out-range error in the respective primary position signal or the secondary position signal, wherein the presence of the in-range error is based on the respective primary position signal or the secondary position signal exceeding a second predetermined threshold; and
        determine an action to be performed based, at least in part, on the presence of at least one of the out-range error and the in-range error in the respective primary position signal or the secondary position signal.

20. The machine of claim 19, wherein the error detection module is further communicably coupled to the position detection system and the transmission module.

* * * * *